United States Patent [19]

Teraoka et al.

[11] Patent Number: 4,485,304

[45] Date of Patent: Nov. 27, 1984

[54] RADIATION IMAGE RECORDING SYSTEM

[75] Inventors: Masanori Teraoka; Takao Komaki; Seiji Matsumoto, all of Kanagawa, Japan

[73] Assignee: Fuji Photo Film Co., Ltd., Kanagawa, Japan

[21] Appl. No.: 339,797

[22] Filed: Jan. 15, 1982

[30] Foreign Application Priority Data

Jan. 16, 1981 [JP] Japan .................................. 56-4890

[51] Int. Cl.$^3$ ............................................. G01T 1/11

[52] U.S. Cl. ............................... 250/327.2; 250/484.1

[58] Field of Search .................. 250/327.2, 337, 484.1; 364/414, 515

[56] References Cited

U.S. PATENT DOCUMENTS 3,558,308 1/1971 Fletcher .......................... 250/327.2

3,790,784 2/1974 Webb et al. ........................ 250/337

4,400,619 8/1983 Kotera et al. .................... 250/327.2

*Primary Examiner*—Janice A. Howell

*Attorney, Agent, or Firm*—Sughrue, Mion, Zinn, Macpeak & Seas

[57] ABSTRACT

A radiation image recording system having a built-in light source for erasing the fog developing in a stimulable phosphor used in a radiation image recording and reproducing method in which a radiation image is once recorded on a stimulable phosphor sheet and then read out and reproduced into a visible radiation image. The light source is positioned between a section for feeding the stimulable phosphor sheet and a section where a radiation image is recorded on the sheet. The system is also provided with a unit for sending the stimulable phosphor sheet from the radiation image recording section to a sheet receiver or a radiation image information read out and reproducing system.

12 Claims, 6 Drawing Figures

RADIATION IMAGE RECORDING SYSTEM

BACKGROUND OF THE INVENTION

1. Field of the Invention

This invention relates to a radiation image recording system which can carry out noise-free radiation image recording by effectively erasing the noise developing in a visible image reproduced from a stimulable phosphor sheet carrying a radiation image. This invention particularly relates to a radiation image recording system which can carry out noise-free radiation image recording by effectively erasing the noise developing in such a reproduced visible image due to repeated use of the stimulable phosphor sheet in a radiation image information recording and reproducing method where the stimulable phosphor sheet is exposed to a radiation to record a radiation image therein and then exposed to a stimulating ray to emit light in the pattern of the stored image, the emitted light is converted to an electric signal, and a visible image corresponding to the radiation image is reproduced by use of the electric signal.

2. Description of the Prior Art

When certain kinds of phosphor are exposed to a radiation like X-rays, α-rays, β-rays, γ-rays or ultraviolet rays they store a part of the energy of the radiation. Then, when the phosphor which has been exposed to the radiation is exposed to a stimulating ray such as a visible ray, light is emitted from the phosphor upon stimulation thereof in the pattern of the stored energy of the radiation. A phosphor exhibiting such properties is referred to as a stimulable phosphor.

As disclosed in U.S. Pat. Nos. 3,859,527, 4,276,473, 4,315,318 and 4,487,428, and Japanese Unexamined Patent Publication No. 56(1981)-11395, it has been proposed to use a stimulable phosphor for recording a radiation image of the human body for medical diagnosis. In more detail, the stimulable phosphor is first exposed to a radiation to have a radiation image stored therein, the stimulable phosphor is then scanned with a stimulating ray to cause it to emit light therefrom in the pattern of the stored image, and the light emitted from the stimulable phosphor upon stimulation thereof is photoelectrically detected and converted to an electric signal. The obtained electric signal is processed as desired to reproduce a visible image having an image quality suitable for viewing and diagnosis purposes. This radiation image system using the stimulable phosphor has many advantages over conventional radiography using a silver halide photographic material, as described in U.S. Pat. No. 4,276,473 for example.

In the radiation image recording and reproducing method described above, the final visible image may be reproduced in the form of a hard copy or may be displayed on a cathode ray tube. The stimulable phosphor sheet used in this method may be in any of various forms such as a panel, drum or the like, which are herein generally referred to as sheets. For economical reasons, it is desirable that the stimulable phosphor sheet be used repeatedly in many separate radiographic operations.

In order to reuse the stimulable phosphor sheet, it is necessary that the stimulable phosphor sheet to be reused be made completely free from the previously stored radiation image. Theoretically, the radiation energy of the radiation image stored in the stimulable phosphor sheet should disappear when the sheet is scanned with a stimulating ray of a sufficient intensity to cause light to emit therefrom in the pattern of the stored radiation image in the course of the radiation image recording and reproducing process as described above. Actually, however, the stored radiation energy cannot be completely eliminated only with the stimulating ray used to scan the stimulable phosphor sheet during the aforesaid process. Thus a part of the previously stored radiation image remains in the reused stimulable phosphor sheet and inconveniently causes noise to occur in the visible image reproduced from the reused stimulable phosphor sheet. In order to successfully reuse the stimulable phosphor sheet, any such residual radiation image thereon must be erased completely before reuse.

Further, a stimulable phosphor contains a trace of radioactive isotopes such as $^{226}Ra$ and $^{40}K$, which emit radiations and cause the stimulable phosphor sheet to store the emitted radiation energy even when the sheet is not being used in radiography. These traces of radioactive isotopes also constitute a cause of the noise developing in the reproduced visible radiation image. Furthermore, a stimulable phosphor sheet is also affected by environmental radiations such as cosmic rays and X-rays emitted from other X-ray sources and stores the energy thereof. These types of radiation energy (hereinafter referred to as fog) undesirably stored in the stimulable phosphor sheet also cause noise to appear in the visible radiation image reproduced from a reused stimulable phosphor sheet and, therefore, must be erased before reusing the stimulable phosphor sheet.

In order to avoid noise occurring in the reproduced visible radiation image due to the noise originating from the radiation image previously stored in a stimulable phosphor sheet and due to the fog developing during the storage of the sheet, the Applicant has proposed in his U.S. patent appln. Ser. No. 168,795 now U.S. Pat. No. 4,400,619 to stimulate the stimulable phosphor sheet by use of light of wavelengths including the wavelength range of the stimulating ray for the phosphor before storing a radiation image in the stimulable phosphor sheet, thereby to discharge the detrimental radiation energy therefrom to an acceptable extent.

With this method, however, erasing of the residual radiation image and fog in the stimulable phosphor sheet must be effected immediately before using the sheet for radiography. This is necessary to minimize the fog developing in the stimulable phosphor sheet after the erasing is conducted.

The inventors conducted experiments to find what levels of radiation energy of the residual image and the fog in the reused phosphor caused noise to develop in the reproduced visible radiation image to an extent adversely affecting diagnosis. From the results of these experiments, it has been found that, in order to eliminate the detrimental noise due to the residual image, the radiation energy of the radiation image stored in the phosphor must be erased to the order of $10^{-4}$ to $10^{-6}$. Stated differently, the original radiation energy stored in the phosphor must be erased to a level between 0.01 and 0.0001 when the maximum of the original level is 100. On the other hand, the level of the fog developing in the phosphor is generally about 0.1 to 0.001 based on the maximum of the stored original radiation energy which is taken as 100 as described above. It has also been found that the fog must be erased to a level between about 0.01 and 0.0001 in order to prevent the fog from developing detrimental noise in the next radiographic operation.

However, in order to erase the radiation energy of the previously stored radiation image to the order of $10^{-4}$ to $10^{-6}$, the phosphor must be exposed to a high illuminance for a long length of time, for example to 30,000 1× for 100 to 1,000 seconds using a tungsten-filament lamp. This necessitates a large-scale erasing apparatus and, in addition, erasing must be started a considerable length of time before a radiograph is to be taken. Thus it is very difficult in practical use to carry out such a troublesome erasing operation each time a radiograph is to be taken. Further, it is very inconvenient in practical use to install a large-scale erasing apparatus in the vicinity of the radiographic equipment.

The inventors conducted various experiments with respect to the aforesaid two kinds of causes of noise, and have found that the erasability thereof differs considerably between the residual radiation image having a level of radiation energy of about 0.1, which remains in a stimulable phosphor after the radiation energy of the previously stored image is erased from the level of 100 to about 0.1, and the fog accumulated in the stimulable phosphor to a level of about 0.1 when the phosphor is allowed to stand, even though the level of radiation energy is the same. That is to say, after the previously stored image is erased from the level of 100 to about 0.1, the resulting residual image suddenly becomes difficult to erase. For example, the previously stored image can be erased to a level of about 0.1 when exposed to light at an illuminance of 10,000 1× for about 10 seconds, but it takes about 100 seconds for the resulting residual image to be further erased to a level of 0.01. In contrast, the fog of the level of about 0.1 can be erased in less than 1 second at an illuminance of 10,000 1×.

Based on the above-mentioned observations, the inventors have already proposed in U.S. patent application Ser. No. 338,734 a noise erasing method comprising two erasing steps wherein the first erasing, which requires a long period of time to erase the previously stored image, is carried out at an appropriate point of time after the radiation image is stored in a stimulable phosphor and scanned with a stimulating ray, and the second erasing for the fog, which can be erased quickly, is conducted immediately before the next radiographic operation.

According to this proposed method, the first erasing in which the radiation image previously stored in the stimulable phosphor is to be erased at a high illuminance for a long period of time by use of a large-scale apparatus can be carried out at an appropriate point of time after the stimulable phosphor sheet has been used for a radiographic operation. After the first erasing is finished, the stimulable phosphor sheet can be transferred to the vicinity of the site where it is to be used for the next radiographic operation. Thereafter, immediately before the next radiographic operation is to be started, the second erasing can be conducted for a short length of time to erase the fog, if any, by use of a simple small-scale apparatus. Thus this method can effectively eliminate the causes of noise and provide a noise-free reproduced visible radiation image.

However, fog develops if the stimulable phosphor sheet is allowed to stand for a long period after the second erasing is conducted. Therefore, it is preferred that the stimulable phosphor sheet be used for the next recording of a radiation image as soon as possible after the second erasing is conducted. Most preferably, the second erasing should be conducted just prior to the next recording of a radiation image. Namely, it is most preferable that a means for the second erasing be incorporated in the radiation image recording system.

SUMMARY OF THE INVENTION

The primary object of the present invention is to provide a radiation image recording system having a means for erasing the noise in a stimulable phosphor sheet, which is of a small scale and of a simple construction.

Another object of the present invention is to provide a radiation image recording system which can effectively erase the noise in a stimulable phosphor sheet immediately before the stimulable phosphor sheet is to be used to record thereon a radiation image.

A further object of the present invention is to provide a radiation image recording system which can provide a noise-free, sharp radiation image.

The objects of the present invention are accomplished by constituting a radiation image recording system from a sheet feeding section or a sheet feed body fitting section which releasably holds a sheet feed body containing the stimulable phosphor sheets used for the radiation image recording and reproduction, a stimulable phosphor sheet feeding means for supplying said stimulable phosphor sheets from said sheet feed body or said sheet feeding section to a recording position, a stimulable phosphor sheet holding means for holding said stimulable phosphor sheets in said recording position, a sheet delivery means for ejecting said stimulable phosphor sheets from said recording position after a radiation image is recorded on said stimulable phosphor sheets and for delivering them to a sheet receiving section or a radiation image information read out and reproducing system, and a light irradiation means which is used to erase the noise in said stimulable phosphor sheets and which is provided between said sheet feed body fitting section or said sheet feeding section and said stimulable phosphor sheet holding means.

In the present invention, the exposure amount in the second erasing (i.e. the erasing conducted by the radiation image recording system of the present invention) is selected within the range of 1/5 to 3/10,000 based on that in the first erasing of the two step erasing method described above. The term "exposure amount" as used herein means the illuminance of the erasing light multiplied by the time the stimulable phosphor is exposed to the erasing light.

The exposure amount to be used in the second erasing varies according to the sensitivity of the stimulable phosphor used. In general, however, it is at least 3,000 1×·sec., preferably from 15,000 to 30,000 1×·sec. Generally, it need not be above 100,000 1×·sec.

Of course, the power of the light source and the time during which the stimulable phosphor is exposed thereto may be selected freely, provided that an exposure amount within the aforesaid range is secured.

For instance, in the case of a 356 mm×432 mm stimulable phosphor sheet, the aforesaid preferable range of exposure in the second erasing, i.e. from 15,000 to 30,000 1×·sec., can be achieved by exposing the stimulable phosphor sheet to a 500W lamp for at least 0.8 second and to a 1kW lamp for at most 0.8 second. The exposure amount of 3,000 1×·sec. which is the minimum necessary value for the second erasing can be achieved by exposing the stimulable phosphor sheet to a 500W lamp for 0.16 second, while the maximum necessary exposure amount of 100,000 1×·sec. (values higher than this are operable but not necessary for the second erasing) can be obtained by exposure to a 1kW lamp for 2.5 seconds.

DESCRIPTION OF PREFERRED EMBODIMENTS

The present invention will hereinbelow be described in further detail with reference to the accompanying drawings.

Figure 1:
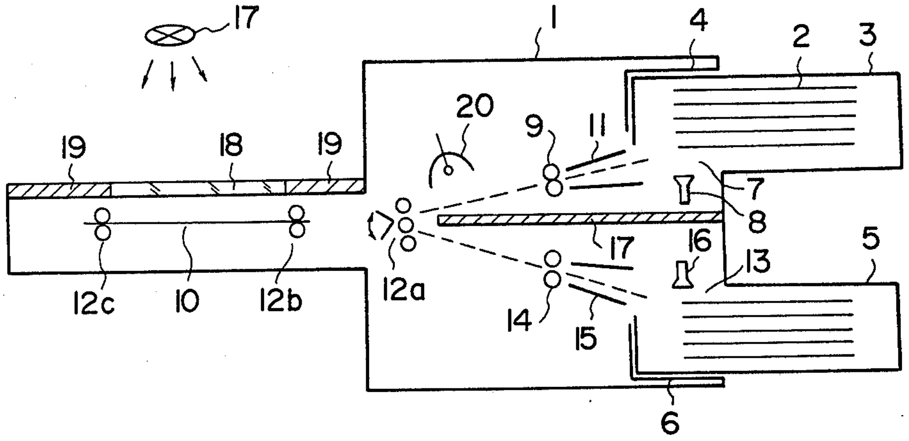
FIG. 1 is a schematic view showing the first embodiment of the radiation image recording system in accordance with the present invention.

FIG. 1 shows the first embodiment of the radiation image recording system in accordance with the present invention in which discrete stimulable phosphor sheets 2 are used.

In FIG. 1, a feed magazine fitting section 4 which releasably holds a feed magazine 3 capable of accommodating a plurality of stimulable phosphor sheets 2 is positioned at the upper section of a radiation image recording system body 1. At the lower section of the body 1 is positioned a receiving magazine fitting section 6 which releasably holds a receiving magazine 5 for receiving the respective stimulable phosphor sheets 2 after radiation images have been recorded therein. In the vicinity of an aperture 7 of the feed magazine 3 is positioned a take-up arm 8 which, using suction, takes up the stimulable phosphor sheets 2 one at a time from the aperture 7 of the feed magazine 3 fitted to the feed magazine fitting section 4. Below the feed magazine fitting section 4 are positioned sheet feed rollers 9, which receive the sheet 2 taken out of the feed magazine 3 by the take-up arm 8 and carry it toward a radiation image recording position 10, and feed guide plates 11 for guiding the sheet 2 to the sheet feed rollers 9. At the recording position 10 are provided a series of sheet loading and unloading rollers 12*a*, 12*b* and 12*c* which load the sheet 2 to and hold it at the recording position 10. Sheet receiving rollers 14 and receiving guide plates 15 are located above the receiving magazine fitting section 6 to move the sheet 2 taken out of the recording position 10 up to an aperture 13 of the receiving magazine 5. In the vicinity of the aperture 13 of the receiving magazine 5 is positioned a receiving arm 16 which sucks the sheet 2 through the aperture 13 and sets it into the receiving magazine 5. At the recording position 10 is provided a radiation transmitting window 18 made of a material which transmits a radiation emitted from a radiation source 17 but shields light of wavelengths including the wavelength range of the stimulating ray for the stimulable phosphor. Shield plates 19 are provided at the necessary sections of the body 1 so as to prevent the stimulable phosphor sheet 2 from being exposed to radiation and stray light of wavelengths including the wavelength range of the stimulating ray.

Further, an illuminant 20 for erasing noise is located between the feed magazine fitting section 4 and the sheet loading and unloading rollers 12*a*. The illuminant 20 may for example be a tungsten-filament, fluorescent, sodium, xenon or iodine lamp or the like. The feed rollers 9, receiving rollers 14, and sheet loading and unloading rollers 12*a*, 12*b*, 12*c* may each be replaced by a belt, chain or the like which can move the sheets 2 at a predetermined speed. The take-up arm 8 may be replaced by any other means which can take up the sheets 2 one at a time from the feed magazine 3. This also applies to the receiving arm 16. A plurality of stimulable phosphor sheets 2 contained in the feed magazine 3 are sucked and taken up one at a time by the take-up arm 8. The illuminant 20 is synchronized with the movement of the stimulable phosphor sheets 2 so as to start emitting light when the forward end of each sheet 2 taken out of the feed magazine 3 reaches the feed rollers 9. The sheet 2 is exposed to light emitted from the illuminant 20 while it is passed under the illuminant 20 at a predetermined speed by the feed rollers 9 and the loading and unloading rollers 12*a*. At this time, the exposure amount for the stimulable phosphor sheet is set at 3,000 to 100,000 1×·sec., preferably from 15,000 to 30,000 1×·sec. The stimulable phosphor sheet 2 is then carried to and held at the recording position by a series of sheet loading and unloading rollers 12*a*, 12*b* and 12*c*. After a radiation image is recorded on the stimulable phosphor sheet 2, the sheet 2 is taken out of the recording position 10 by the loading and unloading rollers 12*a*, 12*b*, 12*c*, and set into the receiving magazine 5 by the receiving rollers 14 and the receiving arm 16. In this embodiment of the present invention, the stimulable phosphor sheet 2 is passed under the illuminant 20 at a predetermined speed, so that the whole surface thereof is uniformly exposed to light emitted from the illuminant 20.

In the above-described embodiment, the speed of the feed rollers 9 to carry the stimulable phosphor sheet 2 must be controlled with respect to the light irradiation power of the illuminant 20 so as to secure an exposure amount within the aforesaid range. It is also possible to have the illuminant 20 turned on continuously, instead of operating it in synchronization with the movement of the stimulable phosphor sheets 2. In this case, however, it is necessary to provide a means for shielding the radiation image recording position 10 and the region downstream therefrom from the light emitted from the illuminant 20.

Figure 2:
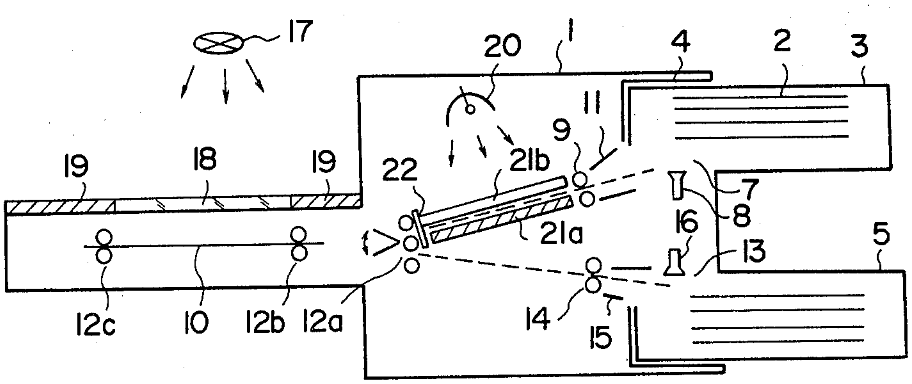
FIG. 2 is a schematic view showing the second embodiment of the radiation image recording system in accordance with the present invention.

FIG. 2 shows the second embodiment of the radiation image recording system in accordance with the present invention. This second embodiment differs from the first described above in that a pair of supporting plates 21*a*, 21*b* are used to guide and support the stimulable phosphor sheets 2 under the illuminant 20 (the supporting plate 21*b* located on the side of the illuminant 20 is transparent, while the supporting plate 21*a* on the opposite side serves as a shielding plate), in that a stopper 22 is provided to hold the stimulable phosphor sheets 2 under the illuminant 20, and in that the illuminant 20 may be a flashlamp. A plurality of stimulable phosphor sheets 2 contained in the feed magazine 3 are sucked and taken up one at a time by the take-up arm 8. The taken-up sheet 2 is moved by the feed rollers 9 and stopped by the stopper 22 with the forward end thereof contacting the stopper 22. In this way, the sheet 2 is supported on the supporting plate 21*a*. In this condition, the stimulable phosphor sheet 2 is exposed to light emitted from the illuminant 20 through the transparent supporting plate 21*b*. At this time, the exposure amount is set at 3,000 to 100,000 1×·sec., preferably from 15,000 to 30,000 1×·sec. When the irradiation is finished, the stopper 22 is retracted, and the stimulable phosphor sheet 2 is moved to the recording position 10 by the sheet loading and unloading rollers 12*a*, 12*b*, 12*c*. In this second embodiment of the present invention, a high brightness flashlamp can be used as the illuminant 20.

Figure 3:
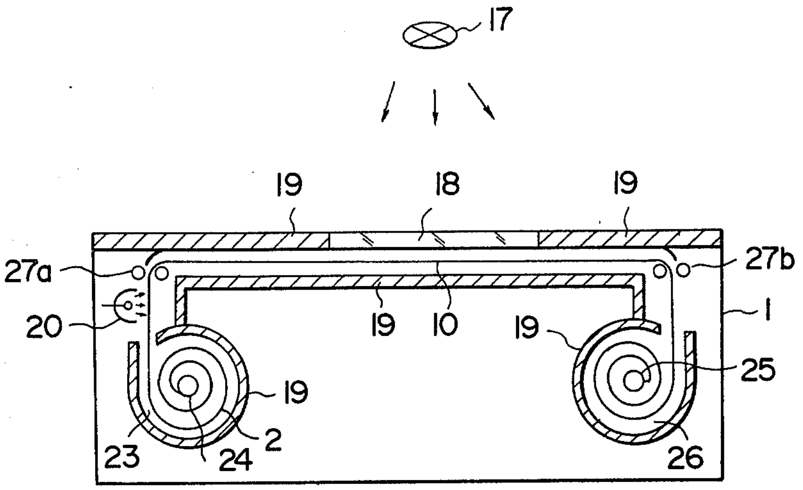
FIG. 3 is a schematic view showing the third embodiment of the radiation image recording system in accordance with the present invention.

In FIG. 3 showing the third embodiment of the radiation image recording system in accordance with the present invention, a strip-shaped stimulable phosphor sheet 2 is used. At one side in the body 1 is positioned a sheet feed body fitting section 24 which releasably holds a sheet feed body 23 containing the rolled stimulable phosphor sheet 2. At the other side in the body 1 is located a sheet receiving section 26 having a wind-up shaft 25 for winding up the strip-shaped stimulable phosphor sheet 2 in the roll form after a radiation image is recorded thereon. Two sets of sheet holding rollers 27*a*, 27*b* are positioned above the sheet feed body fitting section 24 and the wind-up shaft 25 so as to hold the stimulable phosphor sheet 2. At the recording position 10 is provided a radiation transmitting window 18 made of a material which transmits a radiation emitted from the radiation source 17 but shields light of wavelengths including the wavelength range of the stimulating ray for the stimulable phosphor. Shield plates 19 are located around the sheet feed body fitting section 24 and the sheet receiving section 26 as well as other sections requiring shielding so as to prevent the stimulable phosphor sheet 2 from being exposed to radiation and stray light of wavelengths including the wavelength range of the stimulating ray for the stimulable phosphor. Further, the illuminant 20 for erasing the noise is located between the sheet feed body fitting section 24 and the sheet holding rollers 27*a*.

In the third embodiment of the present invention, one end of the stimulable phosphor sheet 2 rolled in the sheet feed body 23 is fitted to the wind-up shaft 25. Then the wind-up shaft 25 is rotated to wind up the stimulable phosphor sheet 2 until a predetermined length thereof is pulled out of the sheet feed body 23. At this time, the illuminant 20 for erasing noise is turned on to emit light and erase the fog stored in the stimulable phosphor sheet 2. After a radiation image is recorded on the stimulable phosphor sheet 2 at the recording position 10, the sheet 2 is wound up around the wind-up shaft 25 and accommodated in the receiving section 26. At the same time, another portion of the stimulable phosphor sheet 2 from which the noise has been erased by the illuminant 20 is passed to the recording position 10. After radiation images are recorded over the entire length of the stimulable phosphor sheet 2, the sheet 2 is completely wound up around the wind-up shaft 25 and ejected from the sheet receiving section 26 together with the wind-up shaft 25, or is rewound into the sheet feed body 23 and ejected from the sheet feed body fitting section 24 in the form of a roll.

In this third embodiment of the present invention, the illuminant 20 is intermittently turned on to erase the noise in the stimulable phosphor sheet 2. However, it is also possible, although not economical, to have it turned on continuously because an excessive exposure amount for erasing the noise does not adversely affect the stimulable phosphor sheet 2.

Figure 4:
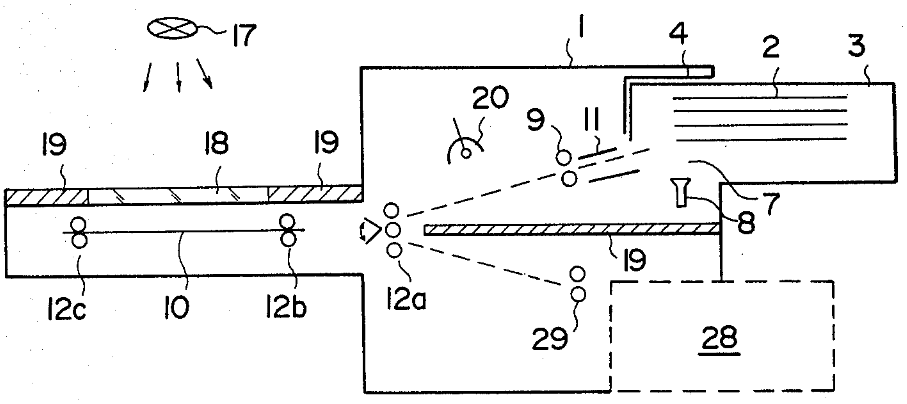
FIG. 4 is a schematic view showing the fourth embodiment of the radiation image recording system in accordance with the present invention.

FIG. 4 shows the fourth embodiment of the radiation image recording system in accordance with the present invention. This fourth embodiment differs from the first embodiment described above in that the receiving magazine fitting section 6, receiving arm 16, sheet receiving rollers 14 and receiving guide plates 15 in the first embodiment are omitted, and in that delivery rollers 29 are provided for sending the stimulable phosphor sheet 2 directly to a radiation image information read out and reproducing system 28 after a radiation image has been recorded on the sheet 2. The stimulable phosphor sheet 2 on which a radiation image has been recorded in the same manner as in the first embodiment is directly sent to the read out system 28, which has a means for irradiating a stimulating ray for reading out the recorded radiation image, a means for detecting the light emitted from the stimulable phosphor sheet 2 upon stimulation thereof or the like, by the delivery rollers 29.

Figure 5:
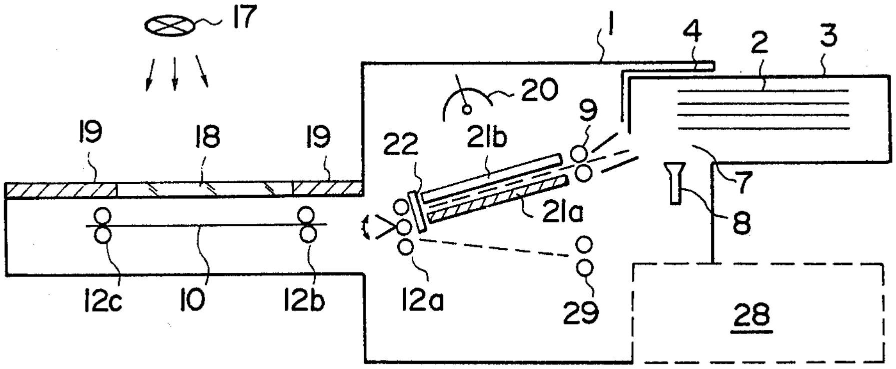
FIG. 5 is a schematic view showing the fifth embodiment of the radiation image recording system in accordance with the present invention.

FIG. 5 shows the fifth embodiment in accordance with the present invention. Like the fourth embodiment described above, this fifth embodiment differs from the second in that the receiving magazine fitting section 6, receiving arm 16, sheet receiving rollers 14 and receiving guide plates 15 in the second embodiment are omitted, and in that delivery rollers 29 are provided for sending the stimulable phosphor sheet 2 directly to a radiation image information read out and reproducing system 28 after a radiation image has been recorded on the sheet 2.

Figure 6:
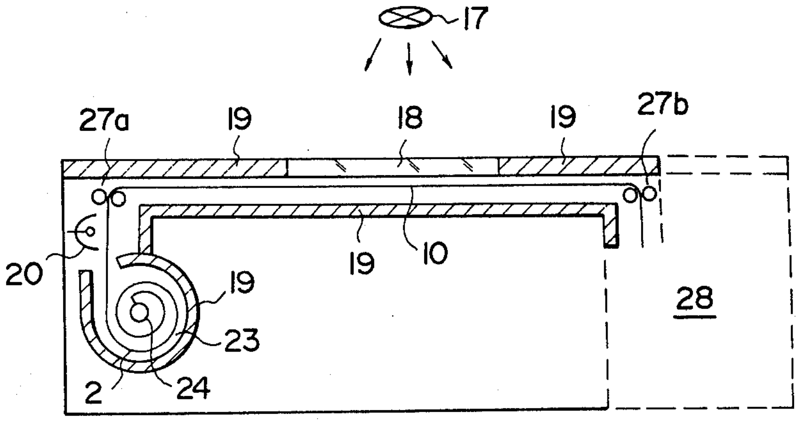
FIG. 6 is a schematic view showing the sixth embodiment of the radiation image recording system in accordance with the present invention.

FIG. 6 shows the sixth embodiment in accordance with the present invention. This sixth embodiment differs from the third described above in that there are no wind-up shaft 25 or sheet receiving section 26. In this embodiment, the stimulable phosphor sheet 2 on which a radiation image has been recorded is directly sent to a radiation image information read out and reproducing system 28.

As described above, the radiation image recording system in accordance with the present invention has a built-in means for irradiating the light for erasing the noise in the stimulable phosphor sheet. It can effectively discharge and erase the fog stored in the stimulable phosphor sheet. Accordingly, the system of the present invention can give a noise-free, sharp visible image when used in the recording and reproduction of a radiation image.

We claim:

1. A radiation image recording system comprising a sheet feed body fitting section which releasably holds a sheet feed body containing stimulable phosphor sheets or a continuous stimulable phosphor sheet used for the radiation image recording and reproduction or a sheet feeding section containing said stimulable phosphor sheets or a continuous stimulable phosphor sheet, a stimulable phosphor sheet holding means for supplying each said stimulable phosphor sheet or predetermined lengths of said continuous stimulable phosphor sheet from said fitted sheet feed body or said sheet feeding section to a recording position, a sheet delivery means for ejecting said stimulable phosphor sheet from said recording position after a radiation image is recorded on said stimulable phosphor sheet and for delivering it to a sheet receiving section or a radiation image information read out and reproducing system, and an irradiation means which is used to erase the noise in said stimulable phosphor sheet and which is provided between said sheet feed body fitting section or said sheet feeding section and said stimulable phosphor sheet holding means such that said stimulable phosphor sheet is exposed to said irradiation means immediately before it is delivered to said recording position.

2. A radiation image recording system as defined in claim 1 wherein said irradiation means has an exposure amount ranging from 3,000 to 100,000 1×·sec.

3. A radiation image recording system as defined in claim 1 wherein said irradiation means has an exposure amount ranging from 15,000 to 30,000 1×·sec.

4. A radiation image recording system as defined in claim 1 further comprising a means for carrying said stimulable phosphor sheets at a predetermined speed from said sheet feed body fitting section or said sheet feeding section to said stimulable phosphor sheet holding means.

5. A radiation image recording system as defined in claim 4 further comprising a guiding means for guiding said stimulable phosphor sheets from said sheet feed body fitting section or said sheet feeding section to said carrying means.

6. A radiation image recording system as defined in claim 4 or 5 wherein the carrying speed of said carrying means is controlled with respect to the power of said irradiation means so as to secure a predetermined exposure amount.

7. A radiation image recording system as defined in claim 1 further comprising a means for taking up said stimulable phosphor sheets one at a time from said sheet feed body fitting section or said sheet feeding section.

8. A radiation image recording system as defined in claim 1 further comprising a supporting means for guiding and supporting said stimulable phosphor sheets between said sheet feed body fitting section or said sheet feeding section and said phosphor sheet holding means.

9. A radiation image recording system as defined in claim 8 wherein said supporting means consists of a pair of plates one of which is transparent.

10. A radiation image recording system as defined in claim 9 wherein said transparent plate of said pair of plates is positioned on the side nearer to said irradiation means than the other.

11. A radiation image recording system as defined in claim 8 further comprising a stopper means for holding said stimulable phosphor sheets in a predetermined position at said supporting means.

12. A radiation image recording system as defined in claim 1 wherein said stimulable phosphor sheet is in the form of a continuous sheet and the holding means also serves as said sheet delivery means.

* * * * *